United States Patent
Cote et al.

(10) Patent No.: US 9,036,712 B1
(45) Date of Patent: May 19, 2015

(54) METHODS AND/OR APPARATUS FOR CONTROLLING ZERO-RESIDUAL CODING IN PREDICTIVE IMAGE/VIDEO CODING

(75) Inventors: Guy Cote, San Jose, CA (US); Huipin Zhang, Santa Clara, CA (US)

(73) Assignee: GEO SEMICONDUCTOR INC., Santa Clara, CA (US)

( * ) Notice: Subject to any disclaimer, the term of this patent is extended or adjusted under 35 U.S.C. 154(b) by 2815 days.

(21) Appl. No.: 11/430,127

(22) Filed: May 8, 2006

(51) Int. Cl.
*H04N 7/12* (2006.01)
*H04N 7/52* (2011.01)

(52) U.S. Cl.
CPC ........................................ *H04N 7/52* (2013.01)

(58) Field of Classification Search
CPC ........................................................ H04N 7/50
USPC .................................................... 375/240.24
See application file for complete search history.

(56) References Cited

U.S. PATENT DOCUMENTS

| 2004/0095511 A1* | 5/2004 | Amara et al. ................. 348/620 |
| 2004/0190626 A1* | 9/2004 | Sun et al. ................. 375/240.18 |
| 2007/0206871 A1* | 9/2007 | Jalil et al. ....................... 382/233 |

\* cited by examiner

*Primary Examiner* — Sath V Perungavoor
*Assistant Examiner* — James Pontius
(74) *Attorney, Agent, or Firm* — Sughrue Mion, PLLC (57) ABSTRACT

A method for coding video is disclosed. The method generally includes the steps of (A) receiving a video signal having a series of pictures, each of the pictures having a plurality of blocks, (B) analyzing the blocks to forecast if coding the blocks in a zero-residual coding mode would generate a plurality of artifacts, (C) disabling the zero-residual coding mode for the blocks forecasted to generate at least one of the artifacts and (D) enabling the zero-residual coding mode for the blocks forecasted to generate none of the artifacts.

20 Claims, 4 Drawing Sheets

METHODS AND/OR APPARATUS FOR CONTROLLING ZERO-RESIDUAL CODING IN PREDICTIVE IMAGE/VIDEO CODING

FIELD OF THE INVENTION

The present invention relates to video processing generally and, more particularly, to a method and/or apparatus for controlling zero-residual coding in predictive image/video coding.

BACKGROUND OF THE INVENTION

In a conventional differential predictive image/video coding system, an encoder performs several intra-predictions and several inter-predictions and then encodes a residual block after settling on a particular prediction. For some cases, an encoder can code individual blocks using only the prediction blocks without residual data. In such cases, the residual of the prediction is considered "zero" and thus not coded. For example, the PSKIP coding mode and the BSKIP coding mode in the H.264/AVC coding standard are used for cases where no prediction residual exists for P-slice blocks and B-slice blocks, respectively.

Zeroing out the residual block is an efficient encoding strategy, since no residual bits are coded and thus fewer bits are used to code the block. Even in a Rate-Distortion Optimized (RDO) mode decision scheme, such coding often results in the smallest rate-distortion cost among all encoding modes. Therefore, zero-residual coding is commonly selected as the optimal encoding mode in terms of a rate-distortion cost.

In terms of the perceptual quality, the zero-residual coding strategy is not always optimal due to noticeable artifacts. More specifically, for a block that contains a few pixels that are quite different from the prediction pixels, an encoder can still code the prediction residual block as "zero" according to the rate-distortion cost. The zero-residual coding mode is selected as the "quite different" pixels contribute very little to the overall prediction distortion of the block. Consequently, the actual reconstructed pixels are the prediction pixels. Unfortunately, the reconstructed pixels are quite different from the original pixels for a small number of pixels in a large block (i.e., 16×16 pixels or larger). Thus, the zero-residual coding mode can produce quite noticeable artifacts in the reconstructed images. If the artifacts appear in a reference, slice such as I-slices, P-slices or reference B-slices in video coding, the artifacts can propagate to other pictures via the PSKIP mode or the BSKIP mode, resulting in so-called "sticky" or "trailing" artifacts.

Current methods to control zero-residual coding analyze statistics of the block, such as the high frequency components of the block and the motion and/or edge motion of the block. For example, if the average high frequency of a block is above a threshold, the zero-residual coding is disallowed. Such methods based on the average statistics of a block usually cannot remove the sticky artifacts effectively since the artifacts are due to the prediction and are not reflected in the statistics of the original block.

Other conventional approaches modify the rate-distortion cost for the zero-residual coding for making rate distortion optimization mode decision. Such methods (i) set an extra rate offset for the zero-residual coding mode, (ii) specially define the distortion for the zero-residual coding mode to reflect the local distortion better or (iii) set a special Lagrangian multiplier for the zero-residual coding mode. Such approaches are helpful to reduce the overall probability of choosing the zero-residual coding mode. However, reducing the probability of using the zero-residual coding also penalizes the blocks where the zero-residual coding mode does not generate the sticky artifacts. As such, the coding efficiency is reduced in conventional approaches.

SUMMARY OF THE INVENTION

The present invention concerns a method for coding video. The method generally comprises the steps of (A) receiving a video signal having a series of pictures, each of the pictures having a plurality of blocks, (B) analyzing the blocks to forecast if coding the blocks in a zero-residual coding mode would generate a plurality of artifacts, (C) disabling the zero-residual coding mode for the blocks forecasted to generate at least one of the artifacts and (D) enabling the zero-residual coding mode for the blocks forecasted to generate none of the artifacts.

The objects, features and advantages of the present invention include providing methods and/or apparatus for controlling zero-residual coding in predictive image/video coding that may adaptively control zero-residual coding to (i) maximize coding efficiency, (ii) maintain perceptual image/video quality, (iii) disallow zero-residual coding where artifacts may be generated and/or (iv) allowing zero-residual coding where artifact generation is unlikely.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
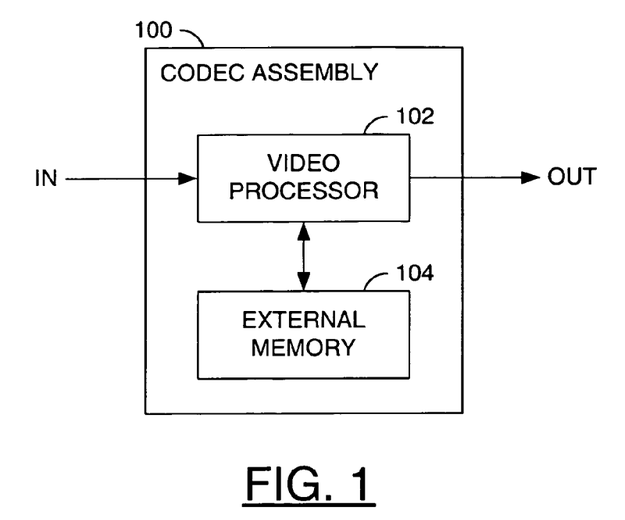
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or system) 100 may be referred to as a encode/decode (CODEC) apparatus. The CODEC apparatus 100 may be operational to control zero-residual coding of a stream of pictures in a video signal by predicting one or more artifacts in cases when a zero-residual mode is considered. The prediction (or forecast) of the artifacts for each of multiple blocks in the pictures is generally based on evaluating the prediction errors of small sub-blocks within each block. If coding any individual sub-block in a zero-residual coding mode would generate the artifacts, the zero-residual coding mode may be disallowed for the entire 16×16 block (macroblock).

The CODEC apparatus 100 generally comprises a circuit (or module) 102 and a circuit (or module) 104. A bidirectional communication link may connect the circuit 102 and the circuit 104. An input signal (e.g., IN) may be received by the circuit 102. The circuit 102 may generate and present an output signal (e.g., OUT).

The signal IN generally comprises a video signal. The video signal may carry a sequence of video pictures. Each of the video pictures generally comprises an array of blocks. The blocks generally contain multiple pixels (or samples). In some embodiments, the signal IN may be compatible with the ITU-R BR 601 Recommendation for a digital video signal. An interface through which the signal IN is received may be compatible with the ITU-R BR 656 Recommendation. The ITU-R recommendations are published by the International Telecommunications Union-Radiocommunications-(ITU-R) Standardization Sector, Geneva, Switzerland. Other standard, proprietary and/or recommended signals and standard, proprietary and/or recommended interfaces may be implemented to meet the criteria of a particular application.

The signal OUT generally comprises a bitstream. The bitstream OUT may carry the video pictures in an encoded and compressed form. The pictures may be encoded as frames (e.g., progressive) and/or fields (e.g., interlaced). The bitstream OUT may have a constant bit rate or a variable bit rate. In some embodiments, the signal OUT may be compatible with the H.264/AVC standard. The H.264/AVC standard is published by the Joint Video Team (JVT) of the International Organization for Standardization/International Electrotechnical Commission (ISO/IEC) Moving Picture Experts Group (MPEG) and the Video Coding Expert Group (VCEG) of the International Telecommunications Union-Telecommunications (ITU-T) Standardization Sector, Geneva, Switzerland. In other embodiments, the encoded bitstream OUT may be compliant with an H.263, H.262 or H.261 standards, also published by the ITU-T. In still other embodiments, the encoded bitstream OUT may be compliant with an MPEG-2 standard or an MPEG-4 standard, published by the ISO/IEC MPEG, Geneva, Switzerland.

The circuit 102 may be referred to as a video processor. The video processor 102 is generally operational to encode and compressed the video input signal IN to generate and present the bitstream signal OUT. The encoding/compression may be defined by the H.264/AVC, MPEG-4, MPEG-2, H.263, H.262 and/or H.261 standards. Other standard or proprietary encoding techniques may be applied to meet the criteria of a particular application.

The circuit 104 may be referred to as an external memory circuit. The external memory circuit 104 is generally operational to buffer portions of the input signal IN, reference frames used by the video processor 102 and reconstructed frames generated by the video processor 102. The external memory circuit 104 may be implemented as a synchronous dynamic random access memory (SDRAM). Other memory technologies may be implemented to meet the criteria of a particular application.

Figure 2:
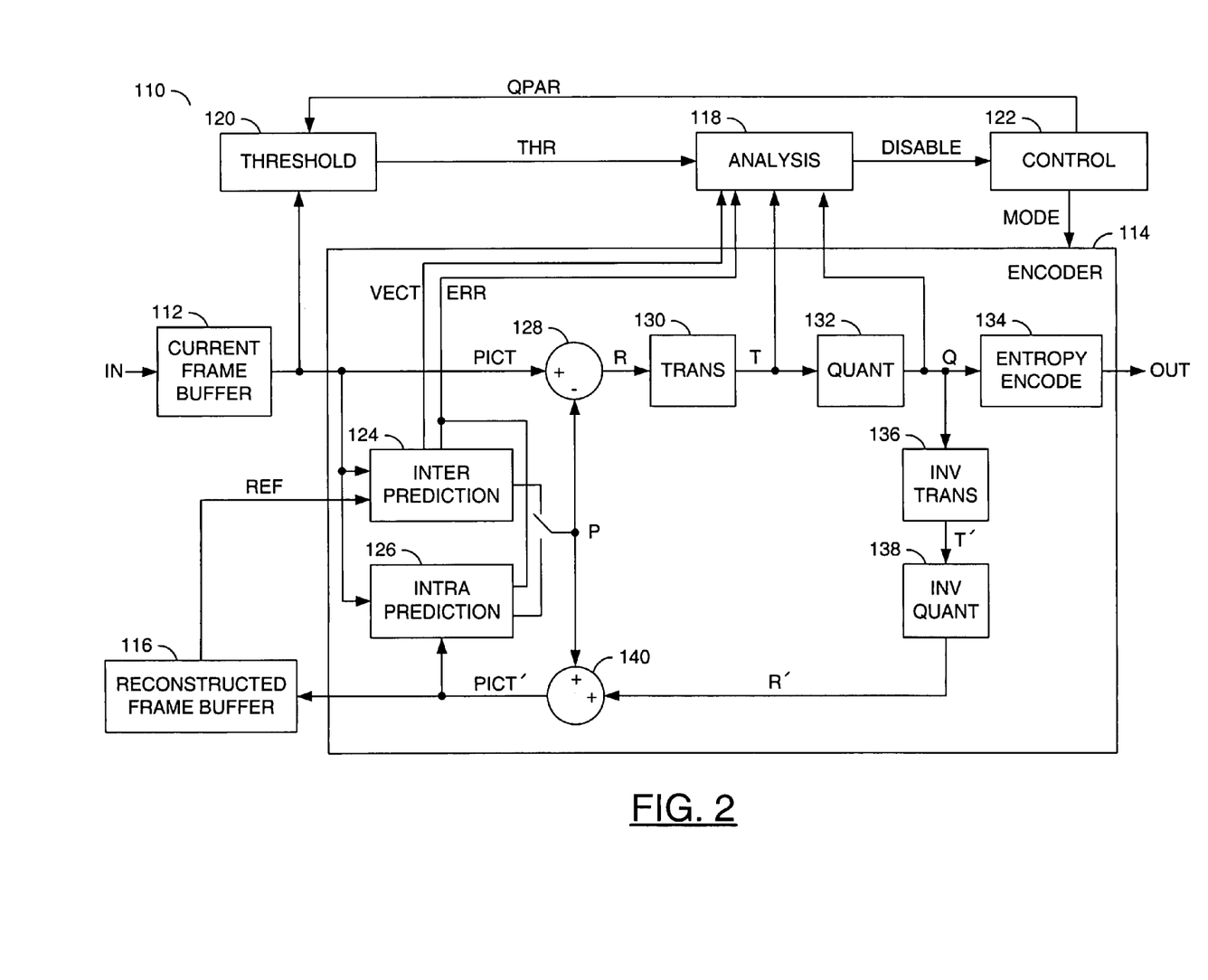
FIG. 2 is a block diagram of an example operational flow of an encode/decode apparatus.

Referring to FIG. 2, a block diagram of an example operational flow 110 of the CODEC apparatus 100 is shown. The operational flow 110 generally comprises a module (or block) 112, a module (or block) 114, a module (or block) 116, a module (or block) 118, a module (or block) 120 and a module (or block) 122. The signal IN may be received by the module 112. The bitstream OUT may be generated by the module 114. A signal (e.g., PICT) may be transferred from the module 112 to the module 114 and to the module 120. The module 114 may present a signal (e.g., PICT') to the module 116. A signal (e.g., REF) may be presented from the module 116 back to the module 114. One or more signals (e.g., ERR, T, Q and/or VECT) may be transferred from the module 114 to the module 118. The module 120 may provide a signal (e.g., THR) to the module 118. A signal (e.g., DISABLE) may be presented from the module 118 to the module 122. The module 122 may present a signal (e.g., MODE) to the module 114. The module 122 may present a signal (e.g., QPAR) to the module 120.

The module 112 may be referred to as a current frame buffer. The current frame buffer 112 may be operational to buffer one or more pictures received in the signal IN. The current frame buffer 112 may be implemented in the memory circuit 104 with the signal IN being received through the video processor 102. The current frame buffer 112 may present a current picture (e.g., field or frame), one picture at a time in the signal PICT to the module 114 and the module 120.

The module 114 may be referred to as an encoder module. The encoder module 114 is generally operational to encode the pictures received in the signal PICT to generate the bitstream OUT. The encoder module 114 may also be operational to generate reconstructed pictures in the signal PICT'. The encoder module 114 may be implemented in the video processor 102.

The module 116 may be referred to as a reference memory buffer. The reference memory buffer may be operational to buffer one or more reference pictures at any given time. The reference pictures may be presented to the encoder module 114 in the signal REF. Reconstructed pictures, in the signal PICT' may also be buffered in the reference memory buffer 116 as new reference pictures. The reference memory buffer 116 may be implemented in the external memory circuit 104.

The module 118 may be referred to as an analysis module. The analysis module 118 may be operational to analyze the sample data received in the signal ERR, the signal T, the signal Q and/or the signal VECT to forecast (or predict) if a zero-residual coding of the data would likely result in one or more artifacts or not. The analysis may be based on one or more adjustable thresholds received in the signal THR and/or one or more fixed thresholds. A first examination approach may be performed in a pixel-domain (e.g., PD Skip control). Another examination approach may be performed in a transform-domain (e.g., TD Skip control). Still another examination approach may consider a motion vector smoothness. Based on the results, the analysis module 118 may present the signal DISABLE to the module 122 in either a disabled state (e.g., disallow zero-residual Code modes) or an enable state (e.g., allow zero-residual code modes). The signal DISABLE may be generated independently for each coding mode (e.g., a bit for a current mode, a bit for each possible mode or a bit for a current state and multiple bits to identify the corresponding coding mode). The video processor 102 may implement any one or more of the above methods to determine whether the sub-blocks are likely to generate artifacts.

The module 120 may be referred to as a threshold module. The threshold module 120 is generally operational to calculate one or more adaptive (or adjustable) thresholds. The adaptive thresholds are generally calculated by examining the picture in the area around a particular block/sub-block being analyzed and/or Quantization Parameters (QP) received in the signal QPAR. The threshold module 120 may be implemented by the video processor 102.

The module 122 may be referred to as a control module. The control module 122 is generally responsible for the controlling the modes (or states) of the encoder module 114. Control information (e.g., encoding mode controls) may be transferred from the control module 122 to the encoder module 114 via the signal MODE. Generation of the encoding mode controls may be determined, in part, by the zero-residual mode enable/disable information received in the signal DISABLE. When the signal DISABLE is in the disabled state for a particular zero-residual code mode or modes (e.g., PSKIP, BSKIP, INTRA16, INTRA8 and INTRA4 modes), the control module 122 may not command the encoder module 114 to use the particular zero-residual code mode or modes. When the signal DISABLE is in the enabled state for the particular zero-residual code mode or modes, the control module 122 is free to command the encoder module 114 to use the particular zero-residual code mode or modes. Enabling/disabling of the zero-residual code modes may be performed independently for each coding mode. The control module 122 may be implemented in the video processor 102.

The encode module 114 generally comprises a module (or block) 124, a module (or block) 126, a module (or block) 128, a module (or block) 130, a'module (or block) 132, a module (or block) 134, a module (or block) 136, a module (or block) 138 and a module (or block) 140. A current picture in the signal PICT may be received by the module 124, the module 126 and the module 128. The module 124 and/or the module 126 may generate and present the signal ERR to the analysis module 118. The module 130 may generate and present the signal T to the analysis module 118 and to the module 132. The module 132 may generate and present the signal Q to the analysis module 118, to the module 134 and to the module 136. The module 126 may generate and present the signal OUT. The signal PICT' may be generated by the module 140. The module 124 may receive the signal REF. The signal VECT may be generated by the module 124.

Inside the encoder module 114, a signal (e.g., P) may be generated by the modules 124 and/or 126 and received by the module 128 and the module 140. The module 128 may present a signal (e.g., R) to the module 130. The module 136 may present a signal (e.g., T') to the module 128. A signal (e.g., R') may be transferred from the module 138 to the module 140. The signal PICT' may be generated and presented from the module 140 to the module 126 and the reconstructed frame buffer module 116.

The module 124 may be referred to as an inter prediction module. The inter prediction module 124 may be operational to generate predicted blocks (comprising multiple sub-blocks) in the signal P using an inter-picture prediction technique. The predicted blocks generated by the inter prediction module 124 may be based on temporal predictions to one or more reference pictures (e.g., frames and/or fields) received in the signal REF. A motion estimation may be performed as part of the inter-picture prediction technique. The motion estimation may generate one or more motion vectors and one or more motion vector predictions for each block under consideration. The motion vectors and the motion vector predictions may be presented to the analysis module 118 in the signal VECT.

The module 126 may be referred to as an intra prediction module. The intra prediction module 126 is generally operational to generate predicted blocks (comprising multiple sub-blocks) in the signal P using an intra-picture prediction technique. The predictions may be based on other pixels (luma samples and chroma samples) elsewhere within the current picture being encoded.

The module 128 may be referred to as a difference module. The difference module may generate blocks and sub-blocks in the signal R as a difference (e.g., residual) of corresponding blocks and sub-blocks, respectively, received in the signal PICT. The residual signal R may carry change information between the blocks/sub-blocks when in a non-zero-residual coding mode. The residual signal R may carry no residual information when in a zero-residual coding mode.

The module 130 may be referred to as a transform module. The transform module 130 may be operational to transform the blocks/sub-blocks received in the signal R into transformed sub-blocks (e.g., 4×4 sub-blocks and/or 8×8 sub-blocks) in the signal T. The transformed sub-blocks generally comprise transformation (e.g., integer transform or DCT transform) coefficients.

The module 132 may be referred to as a quantization module. The quantization module 132 is generally operational to quantize the transform coefficients received in the signal T. The resulting quantized (and transformed) coefficients may be presented in the signal Q.

The module 134 may be referred to as an entropy encoder module. The entropy encoder module 134 may be operational to entropy encode the quantized coefficients, along with other information such as motion vectors, quantization parameters, coding mode information and the like, into the signal OUT.

The module 136 may be referred to as an inverse quantization module. The inverse quantization module 126 may inverse quantize the coefficients received in the signal Q. The inverse quantized coefficients may be presented to the module 138 in the signal T'.

The module 138 may be referred to as an inverse transform module. The inverse transform module 138 may be operational to inverse transform the coefficients received in the signal T' to generate residual blocks/sub-blocks in the residual signal R'.

The module 140 may be referred to as a combine module. The combine module 140 adds the predicted blocks/sub-blocks received in the signal P to the residual blocks/sub-blocks received in the signal R'. The resulting reconstructed blocks/sub-blocks may be presented in the signal PICT'.

Figure 3:
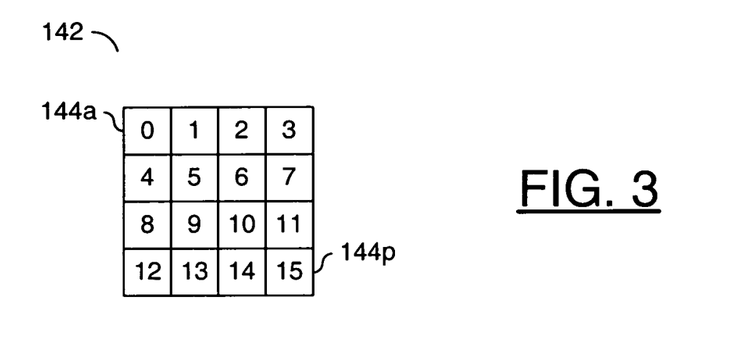
FIG. 3 is a diagram of an example macroblock.

Referring to FIG. 3, a diagram of an example macroblock 142 is shown. The macroblock 142 generally comprises an array (e.g., a 4×4 array) of sub-blocks 144a-144p. Each of the sub-blocks 144a-144p may represent an array (e.g., a 4×4 array for luminance or a 2×2 array for chrominance) of individual pixel elements (e.g., luminance elements and/or chrominance elements).

Detection of the artifacts in the pixel domain may be performed in the analysis module 118. The detection may be based on a strength of the prediction error for each sub-block (e.g., sub-blocks 144a-144p), as calculated by the inter prediction block 124 and/or the intra prediction block 126. The strengths may be measured in terms of (i) a Mean of the Absolute prediction Error (MAE) for a given sub-block or (ii) a Mean of the Squared prediction Error (MSE) for the given predicted sub-block. If the strength of the prediction error of a particular sub-block is above a threshold (e.g., from the signal THR), the particular sub-block may be anticipated to generate one or more artifacts. Otherwise, the particular sub-block may not be anticipated to generate artifacts.

Detection of the artifact in the transform domain may also be performed in the analysis module 118. The detection may be based on the discrete coefficients of the prediction block of the sub-block, before quantization (e.g., the transform coefficients in the signal T) or the discrete coefficients after quantization (e.g., the quantization coefficients in the signal Q). Generation of the coefficients generally means that the sub-block size should be an integer multiple (e.g., 1, 2, 4, etc.) of the size of the transform. The transform may be implemented as, but is not limited to, a Discrete Cosine Transform (DCT), an integer transform or any similar approximation transform. For example, in H.264/AVC where macroblocks are of a size 16×16 samples, the transform size may be 4×4 samples or 8×8 samples. If the number of nonzero discrete coefficients and/or individual discrete coefficient levels and/or a sum of the discrete coefficient levels is above a specified threshold, the sub-block may be considered to generate one or more artifacts. Otherwise, the sub-block may not be considered to generate artifacts.

Figure 4:
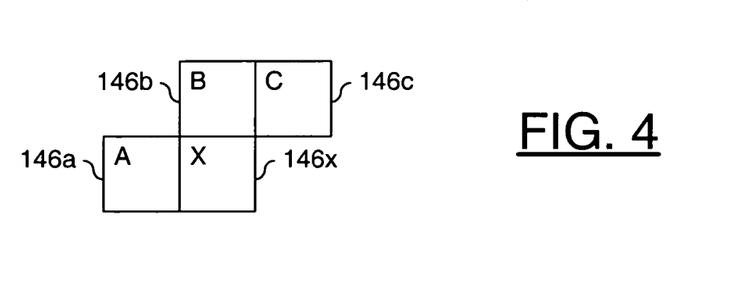
FIG. 4 is a diagram of an example set of neighboring blocks.

Referring to FIG. 4, a diagram of an example set of neighboring blocks 146a-146x is shown. Detection of the artifact based on a motion vector field smoothness may be performed in the analysis module 118. Smoothness of the motion vector field generally provides a mechanism to evaluate a performance of motion compensation. Evaluation of the motion vector smoothness may be based on one or more motion vectors and one or more motion vector predictions received in the signal VECT. If the motion vector field in a block is not smooth across the block, the motion compensation for the entire block may be considered poor and may potentially result in artifacts if encoded with a zero residual inter coding method. If the motion vector field in the macroblock is smooth, artifact generation may be unlikely.

The smoothness of the motion vector field in a particular block (e.g., block 146x) may be determined by comparing the closeness of the motion vectors (e.g., MV) in the particular block 146x with the motion vector predictors (e.g., MVP) for the particular block 146x. The motion vector predictors MVP for the skip mode may be calculated using the motion vectors from the neighboring blocks 146a (e.g., to the left), 146b (e.g., above) and 146c (e.g., above and to the right).

Figure 5:
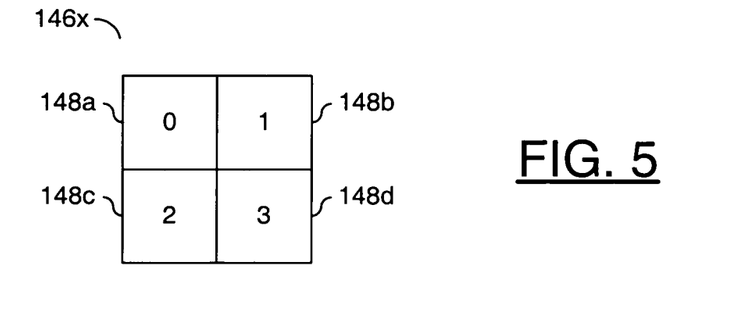
FIG. 5 is a diagram of the particular block divided into 8×8 blocks.

Referring to FIG. 5, a diagram of the particular block 146x divided into 8×8 blocks 148a-148d is shown. Motion estimation may be performed for the 8×8 partitions so that a List0 motion vector for each 8×8 block 148a-148d is available. A Motion Vector Closeness (CMV) of a motion vector MV= (MVx, MVy) with a corresponding motion vector prediction MVP=(MVPx, MVPy) may be defined in equation 1 as follows:

$$CMV = abs(MVx - MVPx) + abs(MVy - MVPy) \quad \text{Eq. (1)}$$

If the motion vector closeness of at least one of the 8×8 blocks 148a-148d is beyond a threshold, the motion vector field in the entire block 146x may not be smooth. Motion compensation for the entire block may be thus considered poor and an artifact likely to be generated if a zero residual inter coding mode is used. Therefore, if one or more of the motion vector closeness CMV values in the 8×8 blocks 148a-148d are above the threshold, the skip coding mode is generally disallowed for the entire block 146x.

The motion vector smoothness for the block 146x may also be evaluated in terms of a sum of closeness values among three respective motion vectors for the block 146a, the block 146b and the block 146c. The resulting skip control method is generally referred to as Motion Vector Correlation (MVC) skip control. The MVC skip control approach may have a simple implementation because the motion vectors for the particular block 146x may not be used and thus motion estimations for the 8×8 blocks may be avoided. Closeness among the motion vectors may be calculated individually along the x-axis and along the y-axis for each pairing of (i) the blocks 146a and 146b, (ii) the blocks 146b and 146c and (iii) the blocks 146a and 146c. A closeness value (e.g., CV) among a motion vector MVA=(MVAx, MVAy) for the block 146a, a motion vector MVB=(MVBx, MVBy) for the block 146b and a motion vector MVC=(MVCx, MVCy) for the block 146c may be defined by equation 2 as follows:

$$CV = abs(MVAx - MVBx) + abs(MVAy - MVBy) + abs(MVBx - MVCx) + abs(MVBy - MVCy) + abs(MVAx - MVCx) + abs(MVAy - MVCy) \quad \text{Eq. (2)}$$

If the closeness value CV is greater than a threshold, the motion vector field neighboring the block 146x may be considered not smooth and an artifact likely to be generated if a zero residual inter coding mode is used. Therefore, if the sum of the six closeness value components is above the threshold, the skip coding mode is generally disallowed for the block 146x.

In some embodiments, the threshold module 120 may generate adaptive thresholds for the strength of the prediction error of the sub-blocks. Forecasting the presence of artifacts may be based on the sensitivity of the Human Visual System (HVS) to the expected artifacts. Since a prediction error of the same strength may or may not be noticeable, depending on the pixel values around the particular sub-block, the threshold for the strength may be adaptive to the pixel values in the neighborhood of the sub-block under consideration. In particular, the threshold may be a Just Noticeable Difference (JND) of the strength of the prediction error, which is generally determined by the pixel values around the sub-block.

Figure 6:
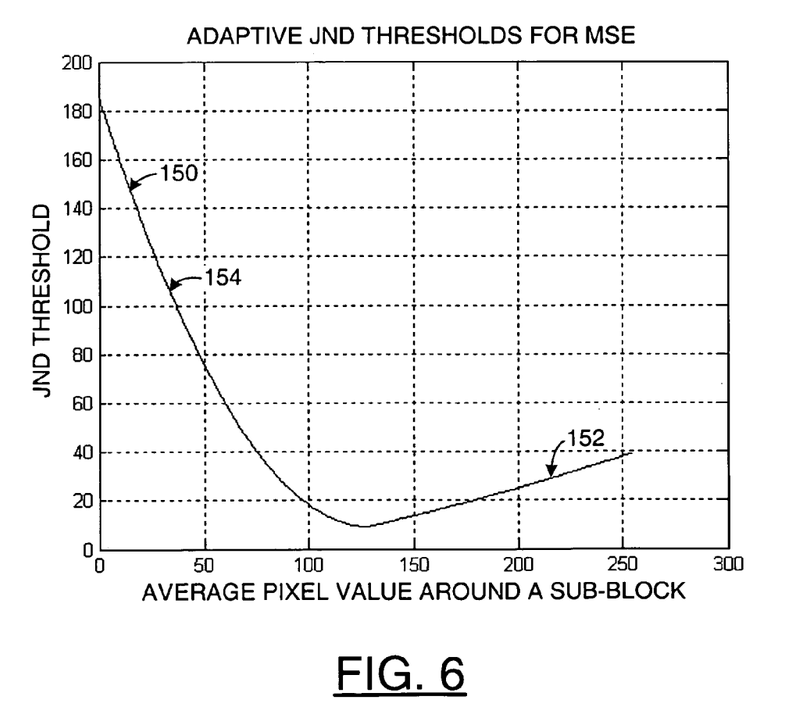
FIG. 6 is a diagram of an example Just Noticeable Difference threshold for a Mean of the Squared prediction Error prediction.

Referring to FIG. 6, a diagram of an example Just Noticeable Difference threshold 150 for a Mean of the Squared prediction Error prediction is shown. Generally, the JND thresholds are larger in both the bright areas (e.g., average pixel values above around 175) and in the dark areas (e.g., average pixel values below around 100) than in the grey area (e.g., average pixel values between around 100 and around 175). A JND threshold generally decreases monotonely as the area gets greyer. However, the decreasing rates may not be symmetric as the area turns greyer from a bright side (e.g., a slope at reference number 152) compared to turning greyer from the dark side (e.g., a slope at reference number 154).

The JND thresholds may be parameterized, for example, as a non-symmetric quadratic model using up to seven parameters per equation 3 as follows:

$$T_{JND}(p) = \begin{cases} a_1 p^2 + b_1 p + c_1, & \text{if } p < P_G \\ a_2 p^2 + b_2 p + c_2, & \text{if } p \geq P_G \end{cases} \quad \text{Eq. (3)}$$

where $a_1$, $b_1$, $c_1$, $a_2$, $b_2$, $c_2$ and p may be the parameters and p may represent an average pixel value around a current sub-block. The parameter $P_G$ generally represents the grey pixel value that has the lowest JND threshold. The parameters $a_1$, $b_1$ and $c_1$ may be used to characterize the JND threshold in the dark side. The parameters $a_2$, $b_2$ and $c_2$ may be used to characterize the JND threshold in the bright side. Alternatively, JND thresholds may be approximated by a linear equation with different parameters above and below a mid-pixel value (e.g., 128).

In some embodiments, the analysis module 118 may use one or more fixed thresholds. The fixed thresholds may be determined base on empirical results. The reduction of the artifacts may be evaluated subjectively. The reduction may also be measured in terms of improvement in a Peak Signal to Noise Ratio (PSNR) or other objective video quality metrics that may correlate well with subjective quality.

The adaptive JND threshold or the fixed thresholds may be different for the luma residuals and the chroma residuals. The Human Visual System (HVS) is typically more sensitive to artifacts in chroma. Therefore, threshold values may be lower for the chroma residuals.

In the PD-skip method, since the prediction error is generally based on the quantized and reconstructed image, the threshold values in the signal THR may be adaptive to the quantization parameters (QP) of the blocks to be encoded.

The prediction error may comprise the quantization noise, thus the threshold values may be proportional to the quantization levels. The threshold values should be larger for larger quantization parameter values and smaller for smaller quantization parameter values. As such, the threshold values generally increase as the quantization parameter grows.

Figure 7:
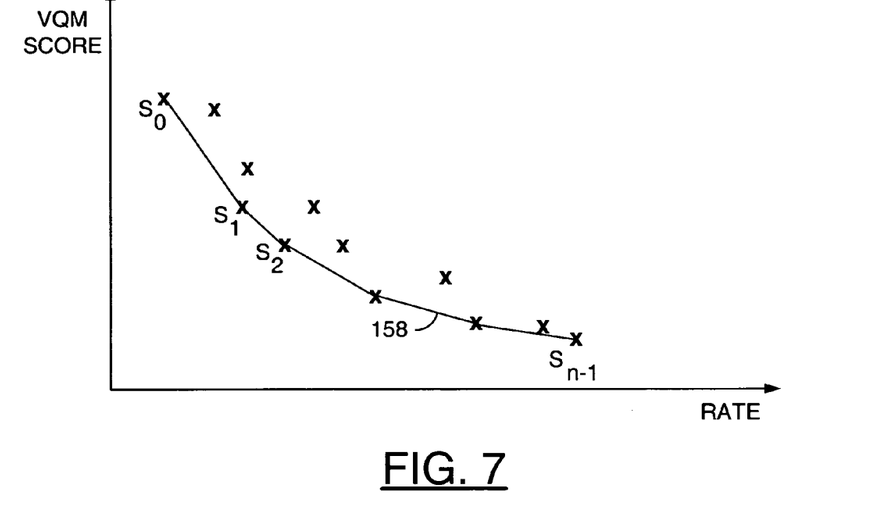
FIG. 7 is a diagram of example video quality metrics as a function of bitrate.

Referring to FIG. 7, a diagram of example video quality metrics as a function of bitrate is shown. An empirical mathematical model for converting the quantization parameter values to the threshold values may be derived based on simulations. For a given quantization parameter value and a selected threshold value, several typical sequences may be encoded under generic encoding conditions. The resulting bitrate (e.g., BR) and Video Quality Metric (VQM) score (e.g. V) may then be computed. The same simulations may be repeated with difference combinations of quantization parameters and thresholds and the corresponding bitrate and VQM scores may be recorded. For each sequence, a convex hull (e.g., curve 158) may be generated in a bitrate-VQM score plane. The corresponding quantization parameter values and threshold values for all pairs (BR, V) on the convex hull curve may then be collected. The collected (QP, threshold) pairs generally correspond to optimal combinations of coding conditions. An empirical model may thus be derived from the collected (QP, threshold) pairs with a mathematical model, such as linear model or quadratic model. If the samples are from a same sequence, the model may be sequence specific. A sequence independent model may also be derived by using the samples from all sequences for the derivation of the model.

Figure 8:
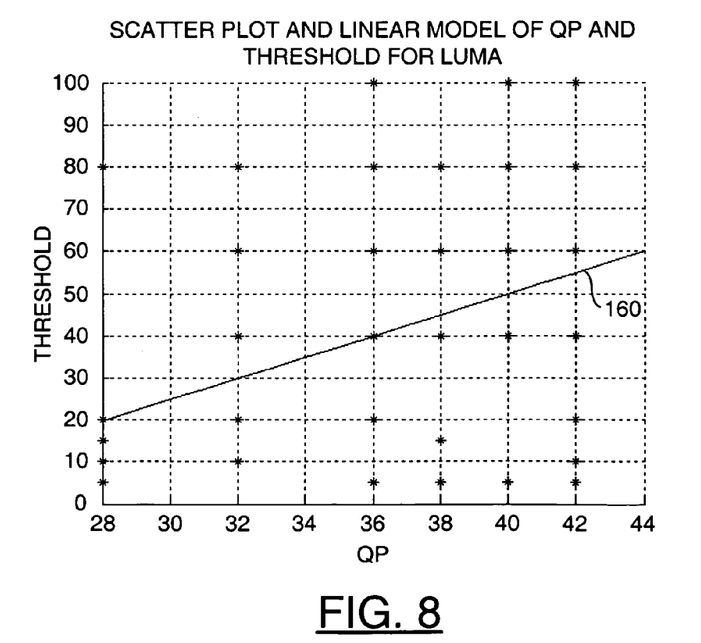
FIG. 8 is a diagram illustrating a scatter plot and linear model of quantization parameters and threshold values.

Referring to FIG. 8, a diagram illustrating a scatter plot and linear model of quantization parameters and threshold values. In the illustration, the (QP, threshold) samples and the corresponding linear model (e.g., line 160) were generally derived using a linear regression. The samples were collected from a simulation using six typical sequences. Therefore, the model may be regarded as a generic model that is applicable to any sequence. The example linear model so derived for luminance is approximated in equation 4 as follows:

$$\text{Thld\_luma} = 2.5 * QP - 50 \qquad \text{Eq. (4)}$$

The threshold for chrominance component was heuristically determined to be about half of that of the luminance component, as approximated in equation 5 as follows:

$$\text{Thld\_chroma} = 1.25 * QP - 25 \qquad \text{Eq. (5)}$$

In some embodiments, the value of QP may be of a current macroblock. In other embodiments, the value of QP may be an average QP value of a picture, a slice or a group of blocks. Similarly, the thresholds may be adaptive to the QP values for the transform domain method (e.g., after quantization).

The above process may be applied to detect zero residual coding artifacts in different encoding modes. For example, the present invention may be applied to an H.264/AVC system to disallow the PSKIP (in P-slices) mode or BSKIP (in B-slices) mode. The present invention may be applied to disallow zero-residual inter prediction modes that could possibly produce artifacts. The present invention may also be applied to disallow zero-residual intra modes that may produce artifacts. For an H.264 encoder, the zero-residual intra modes generally include an INTRA16 mode, an INTRA8 mode and an INTRA4 mode. When a particular intra mode for a 16×16, 8×8 or 4×4 block/sub-block has a zero residual and produces an artifact, the particular intra coding mode may be disallowed for the respective block/sub-block.

The function performed by the flow diagram of FIG. 2 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for coding video, comprising the steps of:
   (A) receiving a video signal having a series of pictures at an encoder, each of said pictures having a plurality of blocks;
   (B) analyzing said blocks within an analysis module in said encoder to forecast if coding said blocks in a zero-residual coding mode would generate a plurality of artifacts; and
   (C) determining said zero-residual coding mode in said encoder based on the analysis of said blocks, further comprising steps of:
     (a) disabling said zero-residual coding mode for said blocks forecasted to generate at least one of said artifacts; and
     (b) enabling said zero-residual coding mode for said blocks forecasted to generate none of said artifacts.

2. The method according to claim 1, wherein step (B) comprises the sub-step of:
   calculating a plurality of error values for a plurality of sub-blocks in each of said blocks by partially coding said sub-blocks in a predictive coding mode.

3. The method according to claim 2, wherein step (C) comprises the sub-step of:
   disabling said zero-residual coding mode for said blocks in which at least one of said error values forecasts at least one of said artifacts.

4. The method according to claim 2, wherein step (B) further comprises the sub-step of:
   forecasting at least one of said artifacts where at least one of said error values exceeds a respective adaptive threshold.

5. The method according to claim 2, wherein step (B) further comprises the sub-step of:
   forecasting at least one of said artifacts where at least one of said error values exceeds a respective fixed threshold.

6. The method according to claim 1, wherein step (B) comprises the sub-step of:
   calculating a plurality of prediction error values in a pixel domain for each of said blocks.

7. The method according to claim 6, wherein step (B) further comprises the sub-step of:

forecasting at least one of said artifacts where at least one of said prediction error values exceeds a respective threshold.

8. The method according to claim 1, wherein step (B) comprises the sub-steps of:
calculating a plurality of motion vector closeness values for each of said blocks; and
forecasting at least one of said artifacts where at least one of said motion vector closeness values exceeds a respective threshold.

9. The method according to claim 1, wherein step (B) comprises the sub-steps of:
calculating a plurality of closeness values among plurality of motion vectors neighboring a current block of said blocks; and
forecasting at least one of said artifacts for said current block where a sum of said closeness values exceeds a respective threshold.

10. The method according to claim 1, wherein step (B) comprises the sub-step of:
calculating a plurality of discrete coefficients in a transform domain for each of said blocks, wherein said discrete coefficients are one group of (i) a plurality of transform coefficients and (ii) a plurality of quantization coefficients.

11. The method according to claim 10, wherein step (B) further comprises the sub-step of:
forecasting at least one of said artifacts where a number of non-zero coefficients among said discrete coefficients exceeds a respective threshold.

12. The method according to claim 10, wherein step (B) further comprises the sub-step of:
forecasting at least one of said artifacts where at least one of said discrete coefficients exceeds a respective threshold.

13. The method according to claim 10, wherein step (B) further comprises the sub-step of:
forecasting at least one of said artifacts where a sum of said discrete coefficients exceeds a respective threshold.

14. An apparatus comprising:
a memory configured to buffer a video signal having a series of pictures, each of said pictures having a plurality of blocks; and
a processor configured to
(i) analyze a particular one of said blocks to determine if coding said particular block in a zero-residual coding mode would generated at least one artifact, and
(ii) determine said zero-residual coding mode based on the analysis of said particular block by
(a) disabling said zero-residual coding mode where said particular block would generate said at least one artifact and (b) enabling said zero-residual coding mode where said particular block would not generate said at least one artifact.

15. The apparatus according to claim 14, wherein said processor is further configured to generate a plurality of threshold values used to determine if said particular block would generate said at least one artifact, one of said threshold values being generated for each of a plurality of sub-blocks within said particular block.

16. The apparatus according to claim 15, wherein said processor is further configured to calculate said threshold values using a just noticeable difference model operating on a plurality of average sample values neighboring said sub-blocks.

17. The apparatus according to claim 15, wherein said processor is further configured to calculate said threshold values based on at least one quantization parameter corresponding to said sub-blocks.

18. The apparatus according to claim 15, wherein said processor comprises:
an encoder module configured to encode said video signal;
an analysis module configured to analyze said particular block;
a control module configured to (i) disable said zero-residual coding mode and (ii) enable said zero-residual coding mode; and
a threshold module configured to generate said threshold values.

19. The apparatus according to claim 14, wherein said zero-residual coding mode comprises (i) at least one inter-coding mode that does not code a residual and (ii) at least one intra-coding mode that does not code a residual.

20. An apparatus comprising:
means for receiving a video signal within an encoder, the video signal comprising a series of pictures, each of said pictures having a plurality of blocks;
means for analyzing said blocks to forecast if coding said blocks using a zero-residual coding mode would generated a plurality of artifacts, the zero-encoding mode being set by a control within the encoder; and
means for determining said zero-residual coding mode based on the analysis of said blocks in the encoder by (i) disabling said zero-residual coding mode for said blocks forecasted to generate at least one of said respective artifacts and (ii) enabling said zero-residual coding mode for said blocks forecasted to generate none of said respective artifacts.

* * * * *